United States Patent
Imms et al.

(10) Patent No.: US 11,487,564 B1
(45) Date of Patent: Nov. 1, 2022

(54) TERMINAL SHELL SWITCHING

(71) Applicant: Microsoft Technology Licensing, LLC, Redmond, WA (US)

(72) Inventors: Daniel John Imms, Bothell, WA (US); Kai-Uwe Maetzel, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/313,956

(22) Filed: May 6, 2021

(51) Int. Cl.
*G06F 9/455* (2018.01)
*G06F 3/14* (2006.01)
*G06F 9/48* (2006.01)
*G06F 9/54* (2006.01)

(52) U.S. Cl.
CPC ............ *G06F 9/45512* (2013.01); *G06F 3/14* (2013.01); *G06F 9/485* (2013.01); *G06F 9/542* (2013.01)

(58) Field of Classification Search
CPC ........ G06F 9/45512; G06F 3/14; G06F 9/485; G06F 9/542
See application file for complete search history.

(56) References Cited

U.S. PATENT DOCUMENTS

| | | | |
|---|---|---|---|
| 2013/0033414 A1* | 2/2013 | Zheng ................. | G06F 9/45512 345/1.1 |
| 2020/0272488 A1* | 8/2020 | Strode, Jr. ........... | G06F 9/45512 |
| 2021/0141562 A1* | 5/2021 | Gu ......................... | G06F 3/048 |

OTHER PUBLICATIONS

Shotts, William, "Terminal Multiplexers." Archived Apr. 1, 2014. https://web.archive.org/web/20140401030014/http://linuxcommand.org/lc3_adv_termmux.php (Year: 2014).*
Imms,et al., "microsoft / vscode", Retrieved from: https://github.com/microsoft/vscode/issues/118066, Mar. 4, 2021, 3 Pages.

* cited by examiner

*Primary Examiner* — John T Repsher, III
(74) *Attorney, Agent, or Firm* — Workman Nydegger

(57) ABSTRACT

Switching shells attached to a terminal. Suppose that a shell has already output text into the terminal, and at that point a new shell is to be attached to the terminal. That subsequent shell is then started up, and text output is gathered from that new shell. Content representing that new shell is then displayed in the terminal. As an example, if the output is the same for the new shell as it was for the old shell, the terminal can just keep the old output displayed in the terminal, and eliminate the need to also output the identical output from the new shell. If the output of the new shell is different than that of the old shell, the terminal may be refreshed and the new content rendered perhaps in a single frame and/or without displaying text associated with this switching activity.

18 Claims, 6 Drawing Sheets

TERMINAL SHELL SWITCHING

BACKGROUND

Prior to the development of Graphical User Interfaces, computing systems operated using text-based operating systems, such as the Disk-based Operating System (DOS). A user could type a text command which would be entered at a command line prompt on the screen. Likewise, the operating system would output text line-by-line on the display. Such text-based line-by-line interfaces are often called a "terminal."

Later, graphical user interface operating systems were developed allowing for a more intuitive and user-friendly computing experience. But still, it is often quite useful to resort to text-based line-by-line interfaces. For example, terminals are still used in software development in order to issue a command to execute a program. Thus, software development can be done using a source code editor and a terminal. The source code editor is a text editor in which a developer can type the source code in text. The terminal can then be used by the developer to issue text commands to build and execute the program.

In the context of a graphical user interface-based operating system, a "terminal" is typically a graphical user interface element that emulates a text-only interface. To assist in this, the terminal is attached to an executable called a "shell". The shell will compile environmental variables that determine the behavior and access of the terminal. As an example, an environment variable may allow access to an open source repository of other code.

An Integrated Development Environment (IDE) includes myriad development tools assisting developers in authoring software. An IDE typically includes at least the source code editor, build automation tools, and a debugger. Often, an IDE can also include a terminal as well, where text commands and output are more intuitive to operate with.

In the context of an IDE, if the shell of a terminal has a change in environment variables, those changes can be applied by relaunching the terminal. When the terminal is relaunched, the terminal displays various lines of text output reflecting that the terminal is being relaunched.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to a computing system switching shells attached to a terminal. This is done in the context of a terminal that receives text commands from a user and provides those text commands to an associated executable (an attached shell) that executes those text commands. The attached shell outputs text, which text is then rendered line-by-line on the terminal. That output could be, for example, responses to the text commands, or status reports regarding the execution of those text commands.

The computing system switches shell attachments from a previous shell to a subsequent shell while reducing jar (unexpected content being displayed) and flicker (one or more blank display frames) that can sometimes happen when relaunching a terminal. That is, suppose that a shell has already output text into the terminal, and at that point a new shell is to be attached to the terminal. That subsequent shell is then started up, and text output is gathered from that new shell. Content representing that new shell is then displayed in the terminal. As an example, if the output is the same for the new shell as it was for the old shell, the terminal can just keep the old output displayed in the terminal, and eliminate the need to also output the identical output from the new shell. Also in this example, if the output of the new shell is different than that of the old shell, the terminal may be refreshed and the new content rendered perhaps in a single frame and/or without displaying text associated with this switching activity. Accordingly, the user is less likely to be confused by the relaunch.

Conventionally, when an environmental variable is added, removed, or modified for a given shell of a terminal that is integrated into an Integrated Development Environment (IDE), the terminal might switch shells in a way that is visible to a user. For instance, the terminal may display events associated with the stopping of the old shell and the starting of the new shell, which the user typically does not care about and perhaps may not even understand. The user may not expect a shell to be launched simply because an environmental variable was changed. The user might not even know that an environmental variable changed at all if the IDE itself automatically caused the change in the environmental variable. In that case, the new displayed events in the terminal may come completely as a surprise. In addition, when relaunching the terminal with a new shell, there could be flicker (one or more frames that do not display the raw output of the shell, but instead display blank content or else text that shows that there is a new shell being started).

With the principles described herein, such jarring output or flicker can be reduced and potentially eliminated, since no text output associated with the switch is shown, and instead the expected output is displayed. As an example, the shell might simply output text that is responsive to the original text command input by the user into the terminal. If the new shell caused different output to be displayed, that content is simply switched out, potentially even in a single frame. Thus, the switch occurs seamlessly. In a prior frame, the old output was displayed, and in the next the new output is displayed, with no frame in-between.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
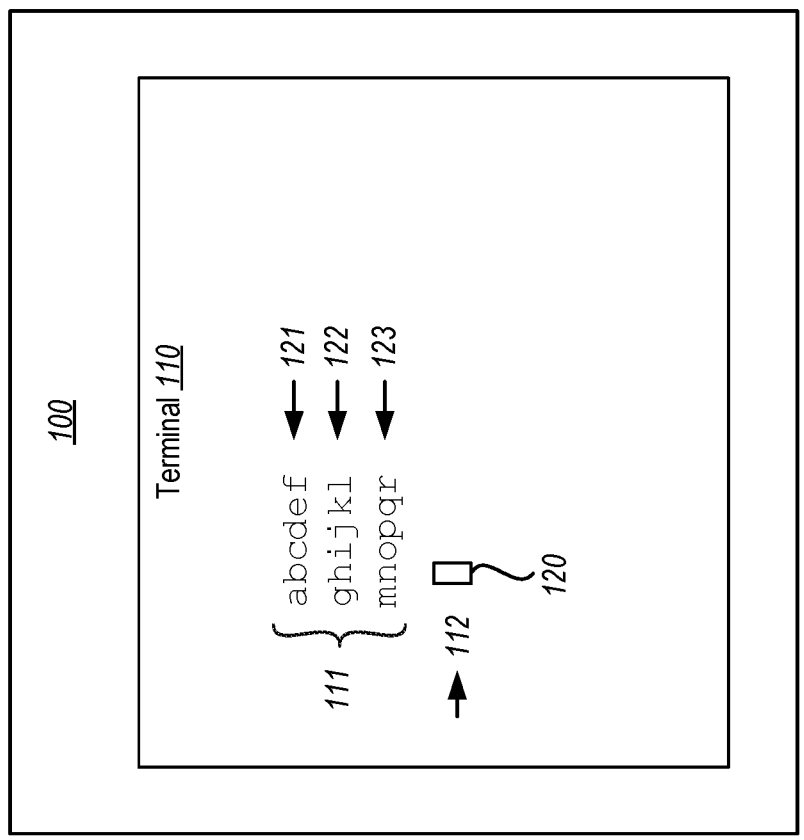
FIG. 1 illustrates a user interface that includes a terminal that has a text-based interface.

The principles described herein relate to a computing system switching shells attached to a terminal. This is done in the context of a terminal that receives text commands from a user and provides those text commands to an associated executable (an attached shell) that executes those text commands. The attached shell outputs text, which text is then rendered line-by-line on the terminal. That output could be, for example, responses to the text commands, or status reports regarding the execution of those text commands.

The computing system switches shell attachments from a previous shell to a subsequent shell while reducing jar (unexpected content) and flicker (one or more blank display frames) that can sometimes happen when relaunching a terminal. That is, suppose that a shell has already output text into the terminal, and at that point a new shell is to be attached to the terminal. That subsequent shell is then started up, and text output is gathered from that new shell. Content representing that new shell is then displayed in the terminal. As an example, if the output is the same for the new shell as it was for the old shell, the terminal can just keep the old output displayed in the terminal, and eliminate the need to also output the identical output from the new shell. Also in this example, if the output of the new shell is different than that of the old shell, the terminal may be refreshed and the new content rendered perhaps in a single frame and/or without displaying text associated with this switching activity. Accordingly, the user is less likely to be confused by the relaunch.

Conventionally, when an environmental variable is added, removed, or modified for a given shell of a terminal that is integrated into an Integrated Development Environment (IDE), the terminal might switch shells in a way that is visible to a user. For instance, the terminal may display events associated with the stopping of the old shell and the starting of the new shell, which the user typically does not care about and perhaps may not even understand. The user may not expect a shell to be launched simply because an environmental variable was changed. The user might not even know that an environmental variable changed at all if the IDE itself automatically caused the change in the environmental variable. In that case, the new displayed events in the terminal may come completely as a surprise. In addition, when relaunching the terminal with a new shell, there could be flicker (one or more frames that do not display the raw output of the shell, but instead display blank content or else text that shows that there is a new shell being started).

With the principles described herein, such jarring output or flicker can be reduced and potentially eliminated, since no text output associated with the switch is shown, and instead the expected output is displayed. As an example, the shell might simply output text that is responsive to the original text command input by the user into the terminal. If the new shell caused different output to be displayed, that content is simply switched out, potentially even in a single frame. Thus, the switch occurs seamlessly. In a prior frame, the old output was displayed, and in the next the new output is displayed, with no frame in-between.

FIG. 1 illustrates a user interface 100 that includes a terminal 110. The terminal is a text-based interface in which output is provided line-by-line, and in which a user inputs text commands at a command prompt. If implemented on the computing system 800 of FIG. 8, the user interface 100 may be displayed on a display that is part of the output mechanisms 812A of the computing system 800.

In the illustrated embodiment, the terminal 110 displays text output 111 including three lines 121, 122 and 123 of text. In the illustrated case, the three lines of text includes the text "abcdef" in the first line 121, "ghijkl" in the second line 122, and "mnopqr" in the third line 123. Of course, this text has no meaning. In a real embodiment, the output displayed in the terminal would have meaning to the user and could be any number of lines. However, because the principles described herein are applicable regardless of the meaning of that output, the text is more arbitrarily represented. The terminal 110 also includes a command prompt 120 at the beginning of a command prompt line 112. The terminal is configured such that the user has the option of entering text commands, such as for example a command to run a named executable.

Figure 2:
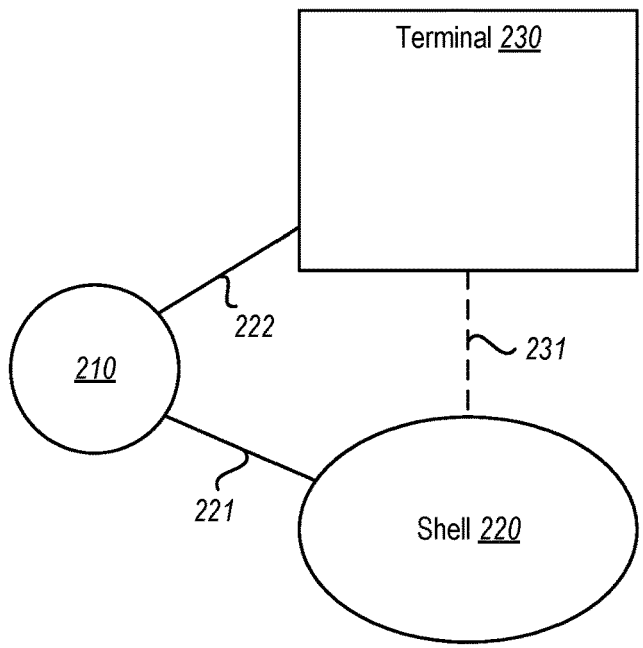
FIG. 2 illustrates a terminal environment that shows a terminal component and a shell that is attached to a terminal.

FIG. 2 illustrates a terminal environment 200 that shows a terminal component 210 and a shell 220 that is attached to a terminal 230. The attachment is represented by a dashed line 231. The terminal component 220 communicates with the terminal 230 as represented by the line 221, and with the terminal 230 as represented by the line 222. The shell 220 represents a set of executable instructions that execute text commands entered into any attached terminal, and provide text output to any attached terminal. If the terminal environment 200 is within the computing system 800 of FIG. 8, the terminal component 210 and the shell 220 may each be structured as described below for the executable component 806 of FIG. 8. Because the terminal environment 200 can be used in order to display and operate the terminal 110 of FIG. 1, the terminal environment 200 will now be described with respect to the user interface 100 of FIG. 1.

The terminal component 210 is configured to cause a terminal 230 to be displayed on a user interface. Referring to FIG. 1 as an example, the terminal component 210 may cause the terminal 110 to be displayed on the user interface 100. The terminal component 210 is also configured to selectively perform shell attachment to the terminal. As an example, the terminal component 210 can attach the shell 220 to the terminal 110, and can detach the shell 220 from the terminal 110.

Furthermore, when a terminal is attached to the shell, the terminal component 210 provides user-entered text commands received in the terminal 230 to the attached shell. As an example, if the shell 220 of FIG. 2 is attached to the terminal 110 of FIG. 1, the terminal component 210 would provide any text commands that the user enters into the command prompt line 112 to the shell 220 for execution. In addition, when a terminal is attached to the shell, the terminal component 210 causes the terminal to display text output generated by the shell 220. As an example, if the shell 220 of FIG. 2 is attached to the terminal 110 of FIG. 1, the terminal component 210 would provide text output generated by the shell 220 as text output 111 in the terminal 110. Thus, the terminal is a text-based user interface which has functionality enabled by an underlying shell.

Figure 3:
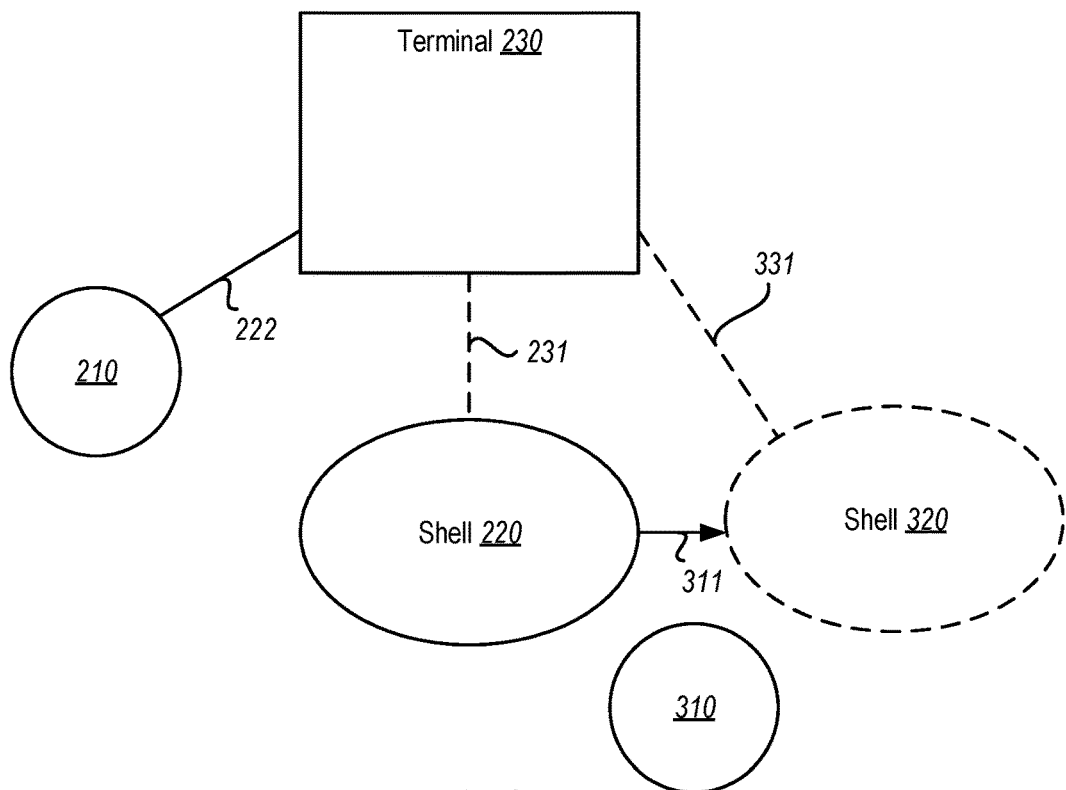
FIG. 3 illustrates a terminal environment that is similar to the terminal environment of FIG. 2, except with the addition of a shell transition component that serves to transition shell attachment for the terminal from one shell to the next, in accordance with the principles described herein.

FIG. 3 illustrates a terminal environment 300 that is similar to the terminal environment 200 of FIG. 2. However, the terminal environment 300 is augmented with a shell transition component 310. If the terminal environment 300 is within the computing system 800 of FIG. 8, the shell transition component 310 may also be structured as described below for the executable component 806 of FIG. 8.

The shell transition component 310 is configured to switch shell attachments of the terminal from a previous shell to a subsequent shell. For example, in FIG. 3, this switching is represented by the arrow 311, representing a shell attachment switch from the terminal 230 being attached (as represented by dashed line 231) to one shell 220 to the terminal 230 being attached (as represented by dashed line 331) to another shell 230. The shell transition component 310 is configured to do this smoothly even when the previous shell (e.g., shell 220) has already provided text output to the terminal 230. For instance, in FIG. 1, suppose that the previous shell 220 has already provided the text output 111 into the terminal 110.

Figure 4:
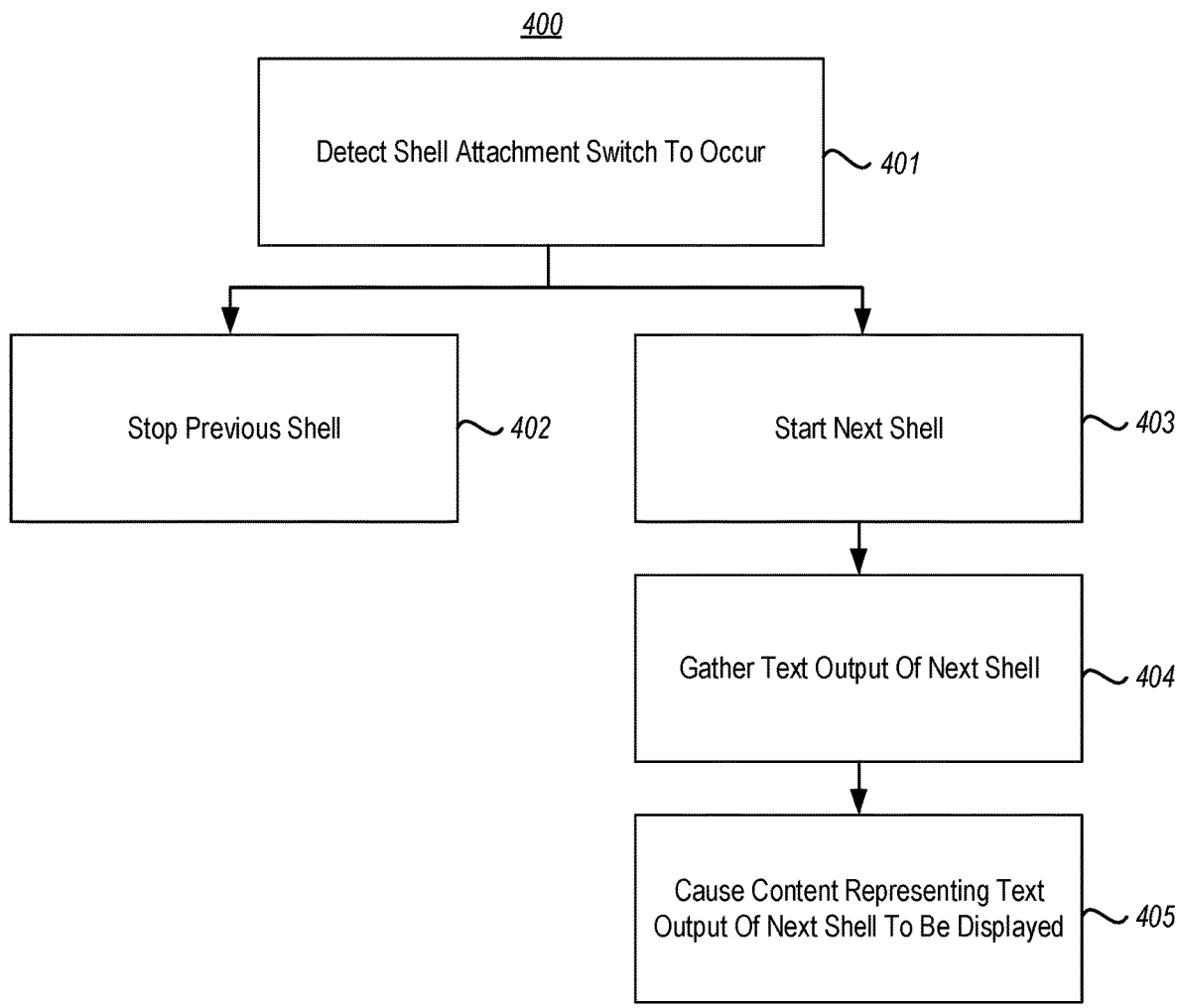
FIG. 4 illustrates a flowchart of a method for a shell transition component to switch shell attachment for the terminal from a first shell to a second shell, in accordance with the principles described herein.

FIG. 4 illustrates a flowchart of a method 400 for a shell transition component to switch shell attachment for the terminal from a first shell to a second shell after the first shell has already caused the terminal to display output, first output, from the first shell. In this description and in the claims, unless otherwise specified, the modifiers "first", "second", and so forth, do not imply any temporal or spatial ordering of the modified items, but is used merely to distinguish one item from another. As an example, in FIG. 3, the shell 220 may be referred to as a first shell that generates first text output for display in the terminal 230, and the shell 320 referred to as a second shell that generates second text output for display in the terminal 230. The method 400 may be performed by the shell transition component 310 in the terminal environment 300 of FIG. 3. Accordingly, the method 400 will now be described with reference to the terminal environment 300 of FIG. 3.

The method 400 is initiated upon detecting that a previous shell (or a "first" shell) is to be switched with a subsequent shell (or a "second" shell). In other words, a terminal is to be switched from being attached to one shell to being attached to another shell. In the example of FIG. 3, suppose that the terminal 230 is to be switched from being attached (as represented by dashed line 231) to the shell 220 to being attached (as represented by dashed line 331) to the shell 320. That is, whereas previously the shell 220 was used to process text input from the terminal 230 and provide text output for display in the terminal 230, after the switch the shell 320 will be used to process text input from the terminal 230 and provide text output for display in the terminal 230.

This detection that shell attachment switching is to occur may be in response to detecting that an environment variable of the previous shell has been edited (i.e., added, removed, or changed). As an example, perhaps the user has edited an environmental variable, or perhaps an integrated development environment that the terminal is integrated into has caused an environmental variable to be edited. An example of an environmental variable is a location of a repository (such as an open source repository) to be used by the shell. Other examples of environment variables include an identification of a home directory of the terminal, a type of terminal, or the like. In general, environmental variables define the function of the terminal, and/or define the terminal's access to resources.

This detection that a new shell is to now be attached to the terminal (act 401) may occur after the prior shell has already provided text output to the terminal. For example, referring to FIGS. 1 and 3, the first shell 220 may have already used its attachment 231 to display the output text 111 in the terminal 110. Referring to FIG. 4, in response to detecting that shell attachment is to be switched, the previous shell is stopped (act 402) so that the previous shell is no longer attached to the terminal and can no longer display output text in the terminal. Additionally, the subsequent shell is started and attached to the terminal (act 403). In FIG. 3, for example, the shell transition component 310 stops the first shell 220 thereby detaching the first shell 220 from the terminal 230, and starts the shell 320.

However, the shell transition component also gathers the output of the subsequent shell (act 404), and causes content representing this output to be displayed on the terminal (act 405). This second output represents output generated by the second shell using the same input that the first shell used to generate the text output already displayed in the terminal. For example, in FIG. 1, the text output 111 is displayed in response to the user entering a text command in the command prompt line 112. However, the second shell likewise generates text output in response to that same text command. That second output by the next shell might be the exact same as the text output generated by the first shell. On the other hand, the second shell might generate text output that is slightly or perhaps very much different than the text output generated by the first shell.

Figure 5:
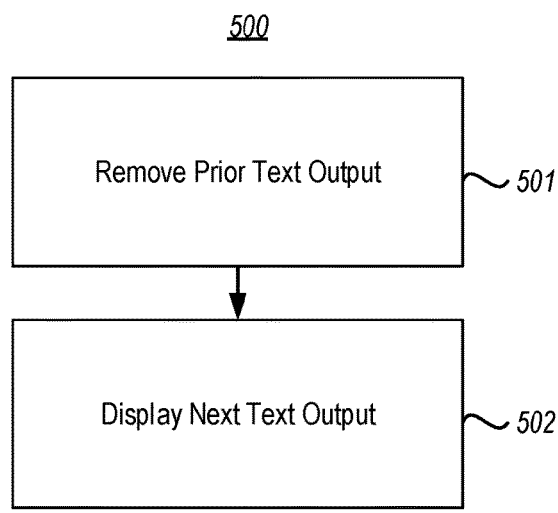
FIG. 5 illustrates a flowchart of a method for the shell transition component to cause the content representing the second output to be displayed in the terminal, in accordance with a first embodiment described herein.

FIG. 5 illustrates a flowchart of a method 500 for the shell transition component to cause the content representing the second output to be displayed in the terminal. This method 500 represents an example of the act 405 of FIG. 4. In the example of FIG. 5, the shell transition component removes the already displayed first output from being displayed in the terminal (act 501) (by for example clearing the terminal), and causes the second output from the next shell to be displayed in the terminal (act 502). To reduce visual impact on the user of this switch, the second output may be displayed starting where a start of the first output had been displayed. Furthermore, the display of the second output may be performed without displaying events representing that the previous shell has been switched to the subsequent shell. To further reduce the impact on the user, the removing of the first output, and the display of the second output may occur in a single frame.

An example may now illustrate how this reduces the visual impact on the user. In the illustrated example of FIG. 1, the text output 111 generated by the first shell includes three lines of text "abcdef", "ghijkl" and "mnopqr". Suppose that the text output generated by the second shell in response to the same text input is slightly different—three lines of text "abcdef", "gHijkl" and "mnopqr". Here, the only change is that the character "h" becomes capitalized. In a real life example, subtle changes might be quite common. As an example, suppose that the previous output generated an elapsed time for a given event "79 ms". The next output generated might have the exact same form except that the elapsed time for a given event might be instead "85 ms". Or perhaps a text representation of a Boolean value might be changed from "T" (representing "True") to "F" (representing "False").

Figure 6:
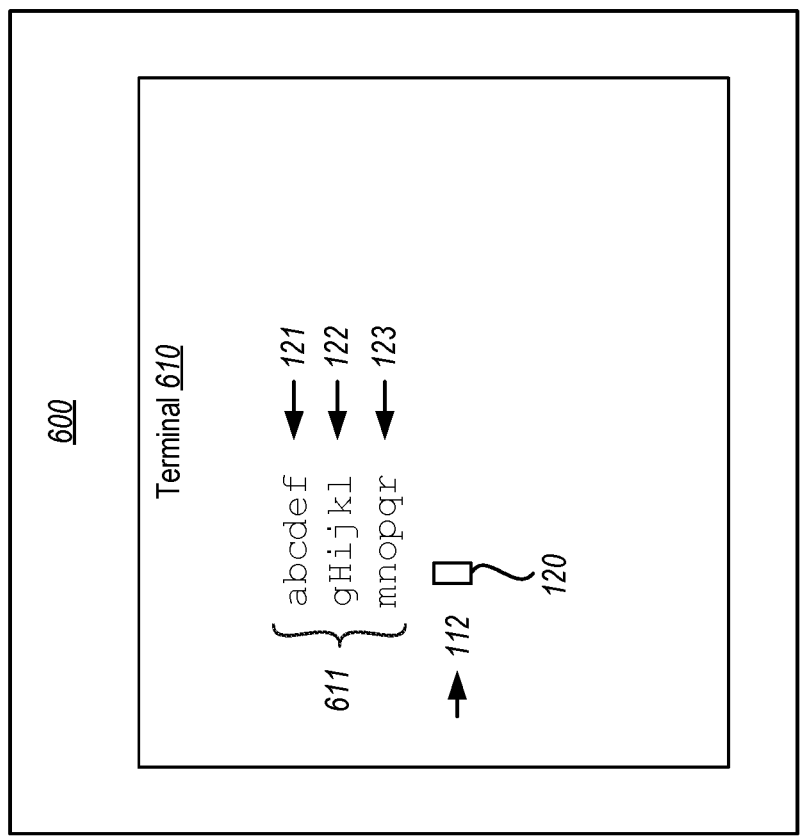
FIG. 6 illustrates a user interface that is similar to that of FIG. 1, except with a minor change in the text output.

FIG. 6 illustrates a user interface 600 that is identical to the user interface 100 of FIG. 1, except that now the terminal 110 includes the output text in which the second output replaces the first output. That is, in this example, the user interface 600 includes a terminal 610 that includes the text output 611 in which the only change is that the "h" is capitalized. Thus, from a user's perspective, if this change is made in a single frame, the change might not even be noticeable at all. Instead, in the prior frame, the letter "h" is lowercase, and in the next frame it is capitalized. Or in another example, in the prior frame the elapsed time read "79 ms" and in the next frame the elapsed time read "83 ms". Thus, when the user or an integrated development environment changes an environmental value, a new shell can be attached to the terminal to implement the environmental change, with the new output seamlessly appearing. All of this occurring without events associated with the shell switch appearing. Thus, the behavior of the terminal has been changed with minimal impact on the user, while the terminal is still displaying the correct text output for the new shell that implements the behavior change.

Figure 7:
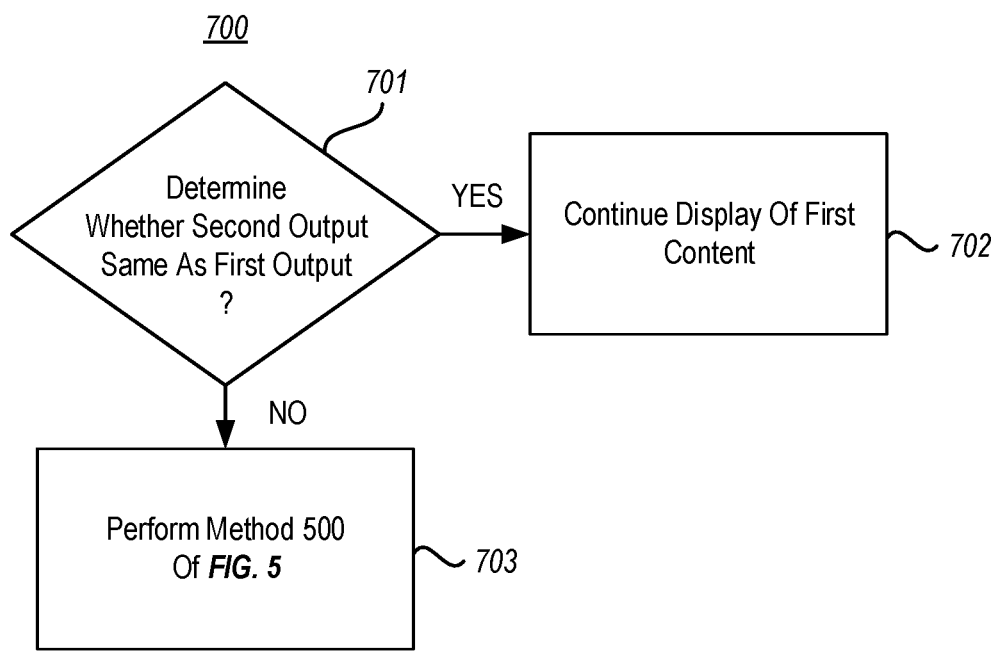
FIG. 7 illustrates a method for the shell transition component to cause content representing the second output to be displayed in the terminal, in accordance with a second embodiment described herein.

FIG. 7 illustrates a method 700 for the shell transition component to cause content representing the second output to be displayed in the terminal. The method 700 also represents an example of the act 405 of FIG. 4. The method 700 augments the method 500 of FIG. 5 by effectively handling a case where the next shell causes no change in the text output. In FIG. 7, the method 700 determines whether the output (the "second" output) from the subsequent shell is the same as the prior output (the "first" output) from the prior shell (decision block 701). If so ("Yes" in decision block 701), the first output is continued to be displayed in the terminal without displaying the second output from the subsequent shell (act 702). This is because that first output text already accurately represents the content of the second output.

On the other hand, if the second output is determined not to be the same as the first output ("No" in decision block 701), then the method 500 of FIG. 5 is performed (act 703). That is, the first output is removed from the terminal (act 501), and the second output is displayed in the terminal (act 502). This is because the first output no longer accurately represents the output of the new shell (e.g., no longer represents accurate output given the edited environmental variable).

Once content representing the new output from the new shell is displayed in the display, the terminal at least now represents accurate output for the currently pending text input. Once the user then enters further text commands in the command prompt line. Those new text inputs will be provided to the new shell for processing, and that new shell will then continue to provide appropriate text output.

The above describes a seamless mechanism for transitioning from one shell to the next. However, the same principles may be repeated for multiple transitions. Accordingly, the principles described herein allow the terminal to change shells any number of times with minimal visual artifacts showing the switches, and with accurate content from whatever shell is currently attached being appropriately displayed.

Because the principles described herein are performed in the context of a computing system, some introductory discussion of a computing system will be described with respect to FIG. 8. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
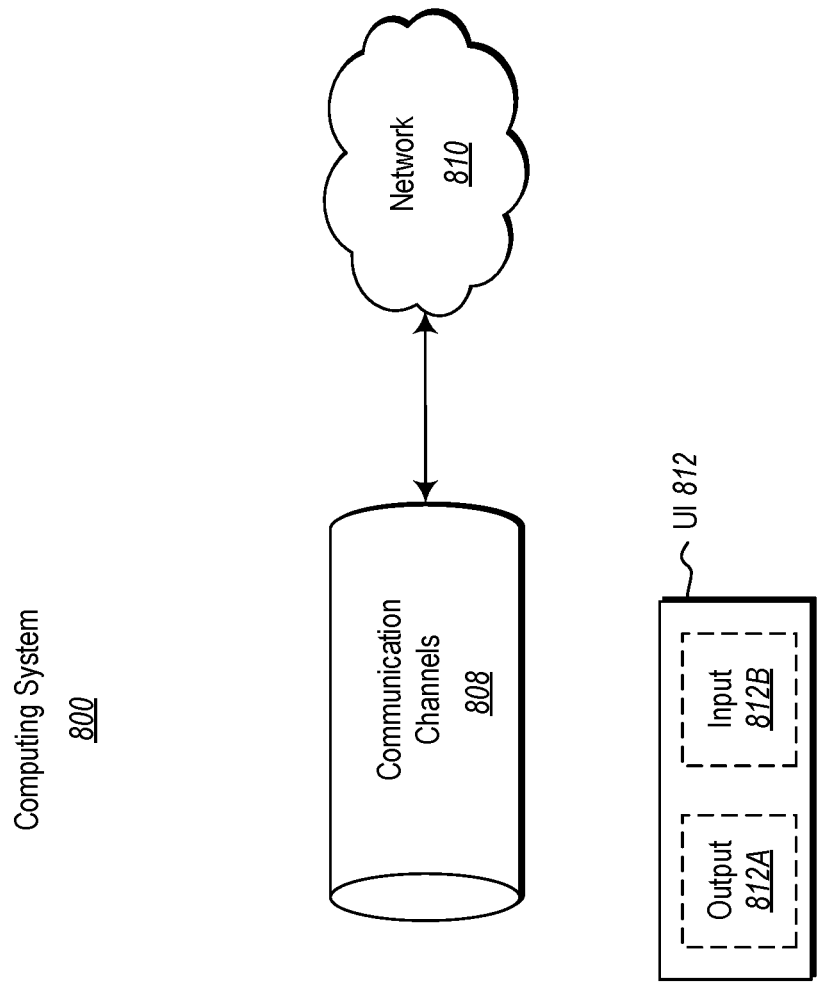
FIG. 8 illustrates an example computing system in which the principles described herein may be employed.

As illustrated in FIG. 8, in its most basic configuration, a computing system 800 includes at least one hardware processing unit 802 and memory 804. The processing unit 802 includes a general-purpose processor. Although not required, the processing unit 802 may also include a field programmable gate array (FPGA), an application specific integrated circuit (ASIC), or any other specialized circuit. In one embodiment, the memory 804 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 800 also has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, virtual or augmented reality, holograms and so forth. Examples of input mechanisms 812B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware storage devices that store computer-executable instructions that are executable by the one or more processors to cause the computing system to:
   cause a terminal to be displayed on a user interface, wherein:
      the terminal is configured to receive text commands entered in the user interface,
      a terminal component provides the text commands to an attached shell that is attached to the terminal,
      the terminal is further configured to display text output, which is generated by the attached shell based on the text commands and which is provided to the terminal via the terminal component, and
      the terminal is integrated in an integrated development environment (IDE);
   trigger a shell attachment switch in which the terminal switches from being attached to a previous shell to being attached to a subsequent shell, wherein:
      the shell attachment switch is triggered (i) after the previous shell has already generated first output, (ii) after the first output has already been provided to the terminal by the terminal component, and (iii) after the terminal has already displayed the first output, and
      the shell attachment switch in triggered in response to a detection that the IDE has modified an environmental variable of the terminal, where the environmental variable determines a behavior and/or an access to the terminal;
   after the subsequent shell is started, cause the terminal component to gather second output from the subsequent shell; and
   after the terminal component provides the second output to the terminal, cause the second output to be displayed in the terminal.

2. The computing system in accordance with claim 1, wherein the shell attachment switch further includes:
   removing the first output from being displayed in the terminal; and
   causing the second output to be displayed in the terminal.

3. The computing system in accordance with claim 2, the second output being displayed starting where a start of the first output had been displayed.

4. The computing system in accordance with claim 2, wherein removing the first output and causing the second output to be displayed occurs in a same display frame such that in a previous frame the first output is displayed and in an immediately following frame the second output is displayed without the first output being displayed.

5. The computing system in accordance with claim 2, wherein the second output is displayed in the terminal without displaying events representing that the previous shell has been switched with the subsequent shell.

6. The computing system in accordance with claim 2, wherein the shell attachment switch is performed in response to detecting that an environment variable of the previous shell has been added, removed, or changed.

7. The computing system in accordance with claim 1, wherein the shell attachment switch further includes:
   determining whether the second output from the subsequent shell is the same as the first output; and
   if the second output is determined to be the same as the first output, causing the first output to continue to be displayed without displaying the second output from the subsequent shell.

8. The computing system in accordance with claim 7, wherein the terminal component is further configured to provide subsequent output, which is generated by the subsequent shell, to the terminal after the second output has already been displayed in the terminal.

9. The computing system in accordance with claim 1, wherein the shell attachment switch includes:
   determining whether the second output from the subsequent shell is the same as the first output; and
   if the second output is determined to not be the same as the first output, removing the first output from the terminal and causing the second output to be displayed in the terminal.

10. The computing system in accordance with claim 1, wherein the shell attachment switch includes:
    stopping the previous shell so that the previous shell is no longer attached to the terminal.

11. A method for facilitating a shell attachment switch, said method comprising:
    causing a terminal to be displayed on a user interface, wherein:
       the terminal is configured to receive text commands entered in the user interface, a terminal component provides the text commands to an attached shell that is attached to the terminal, the terminal is further configured to display text output, which is generated by the attached shell based on the text commands and which is provided to the terminal via the terminal component, and the terminal is integrated in an integrated development environment (IDE);

triggering a shell attachment switch in which the terminal switches from being attached to a previous shell to being attached to a subsequent shell, wherein:

the shell attachment switch is triggered (i) after the previous shell has already generated first output, (ii) after the first output has already been provided to the terminal by the terminal component, and (iii) after the terminal has already displayed the first output, and the shell attachment switch in triggered in response to a detection that the IDE has modified an environmental variable of the terminal, where the environmental variable determines a behavior and/or an access to the terminal;

after the subsequent shell is started, causing the terminal component to gather second output from the subsequent shell; and after the terminal component provides the second output to the terminal, causing the second output to be displayed in the terminal.

12. The method in accordance with claim 11, wherein causing the second output to be displayed in the terminal includes:

removing the first output from being displayed in the terminal; and causing the second output to be displayed in the terminal.

13. The method in accordance with claim 12, wherein removing the first output and causing the second output to be displayed occur in a same display frame such that in a previous frame the first output is displayed, and in an immediately following frame the second output is displayed without the first output being displayed.

14. The method in accordance with claim 12, the method being performed without displaying events representing that the previous shell has been switched with the subsequent shell.

15. The method in accordance with claim 11, wherein causing the second output to be displayed in the terminal includes:

determining whether the second output from the subsequent shell is the same as the first output; and if the second output is determined to be the same as the first output, causing the first output to continue to be displayed without displaying the second output from the subsequent shell.

16. The method in accordance with claim 11, wherein causing the second output to be displayed in the terminal includes:

determining whether the second output from the subsequent shell is the same as the first output; and if the second output is determined to not be the same as the first output, removing the first output from the terminal and causing the second output to be displayed in the terminal.

17. The method in accordance with claim 11, wherein the environmental variable includes one or more of a location of a repository, identification of a home directory, or a type of the terminal.

18. A computer system configured to facilitate a shell attachment switch, said computer system comprising:

one or more processors; and one or more computer-readable hardware storage devices that store instructions that are executable by the one or more processors to cause the computer system to:

cause a terminal to be displayed on a user interface, wherein:

the terminal is configured to receive text commands entered in the user interface, a terminal component provides the text commands to an attached shell that is attached to the terminal, the terminal is further configured to display text output, which is generated by the attached shell based on the text commands and which is provided to the terminal via the terminal component, and the terminal is integrated in an integrated development environment (IDE);

trigger a shell attachment switch in which the terminal switches from being attached to a previous shell to being attached to a subsequent shell, wherein the shell attachment switch in triggered in response to a detection that the IDE has modified an environmental variable of the terminal, where the environmental variable determines a behavior and/or an access to the terminal, and wherein the shell attachment switch is triggered:

after the previous shell has already generated first output, after the first output has already been provided to the terminal by the terminal component, and after the terminal has already displayed the first output;

cause the terminal component to gather second output from the subsequent shell, wherein:

the second output is generated by the subsequent shell based on the text commands that were previously entered in the terminal, and the second output is different than the first output, which was generated by the previous shell; and after the terminal component provides the second output to the terminal, cause the second output to be displayed in the terminal.

* * * * *